April 26, 1966  J. W. BRADBURY  3,248,138
METHOD OF AND MEANS FOR CONNECTING TWO ELEMENTS IN
DRIVING RELATIONSHIP
Filed Oct. 19, 1962

INVENTOR.
JAMES W. BRADBURY
BY Warren Finney
ATTORNEY

United States Patent Office 3,248,138
Patented Apr. 26, 1966

3,248,138
METHOD OF AND MEANS FOR CONNECTING TWO ELEMENTS IN DRIVING RELATIONSHIP
James W. Bradbury, 117 W. Arcadia Drive, Middletown, Ohio
Filed Oct. 19, 1962, Ser. No. 231,650
3 Claims. (Cl. 287—119)

This invention relates to a shaft connector and a method of assembling a connection. The invention has application under numerous conditions, wherein, for example, a driving member is to actuate a driven member, either rotationally or axially, or wherein a shaft or stud requires tight connection with a cylindrical sleeve, collar, or other element fitted thereto.

An object of the invention is to provide simple and economical means for establishing a connection between two elements, such as a shaft and a collar, or sleeve, of slightly resilient but substantially firm non-metallic material of the class of relatively thick plastic.

Another object is to provide a method and means of completing a connection between a shaft or rod, and a collar of the character stated, which connection is exceedingly durable and trouble-free as well as highly resistive to slippage or relative movement between the connected parts.

Another object is to provide a tight, durable, and service-free connection between elements of the character mentioned, without resort to keys, splines, flats or other aids usually employed to overcome slippage or disarrangement of the elements under stress and strain conditions.

A further object is to provide such a connection as is above referred to, incorporating structure whereby the connection becomes increasingly effective under working conditions which subject the connection to heat, externally or internally.

Another object is to expedite and facilitate establishing a tight connection between plastic and metallic parts of the type referred to, with substantial savings of time, labor, and expense.

The foregoing and other objects are attained by the means described herein and illustrated upon the accompanying drawing, in which.

Figure 1:
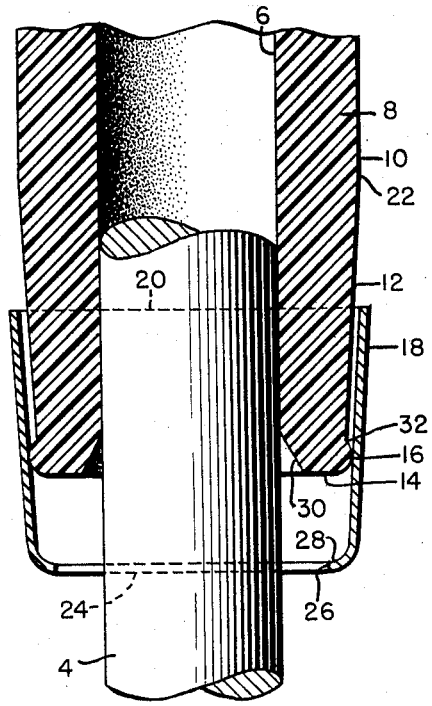
FIG. 1 is a fragmental cross-section taken longitudinally of the shaft connector, and showing the elements thereof in a ready-to-be-assembled relationship.

In the drawing, the numeral 4 indicates generally a shaft or rod of metal or equivalent rigid material, to be tightly fitted within the bore 6 of a collar or sleeve 8 so that the parts may be positively locked against relative movement both rotational and axial under normal use conditions.

The shaft or rod of metal or the like is shown solid and cylindrical of form, although it might as well be in the nature of a hollow pipe or tube, if desired. Shaft 4 could be considered a driving shaft and sleeve 8 a driven element, or vice versa, by way of example.

Collar or sleeve 8 may be a formed element of plastic having the characteristics of inherent resiliency to a slight degree, and firmness to the extent that the sleeve will not easily bend from a normal straight axis, nor will it noticeably twist, if used to transmit rotary motion. The plastic material possesses also an ability to cling frictionally to a smooth surface against which it is tightly pressed, particularly in opposition to coplanar sliding movement.

The straight uniform bore of the sleeve preferably is dimensioned to slip-fit about the shaft 4 at normal temperatures. The outer wall 10 of the sleeve preferably is tapered as at 12 to a reduced diameter, in the direction of sleeve end 14. Close to the end 14, however, there is formed an outwardly extended annulus or lip 16, the diameter of which exceeds the diameter of the tapered sleeve portion adjacent to the annulus or lip. The diameter of the sleeve across the annulus should be less than that of the sleeve at the largest part of the taper, in the preferred form of the invention. It may be considered that the tapered sleeve or collar is bulbous at an end thereof, with the outwardly extending annular lip 16 defining the end portion.

The character 18 indicates a deep-drawn or otherwise formed metallic cup or pressure ring, whose substantially cylindrical side wall is tapered correspondingly to the taper of sleeve 8. The depth of the cup may approximate the length of the sleeve taper. The cup has a plain open end 20 which in diameter is no greater than, and preferably slightly less than, the diametral dimension of the sleeve at the base portion 22 of the taper.

The cup 18 at its bottom end 24 is open, the opening 26 thereof being considerably larger in diameter than the diameter of shaft 4, but smaller than the open upper end 20 of the cup. Opening 26 moreover is concentric with and smaller in diameter than the annular lip 16 and all other portions of the sleeve taper.

A concentric ledge 28 within the cup defines the opening 26, and meets the cup side wall with a filleted or rounded inside corner. The inside diameter of cup 18 at a point midway between its ends 20 and 24, should approximate the normal diameter of annulus or lip 16, as shown in FIG. 1, thereby to offer resistance to full insertion of the tapered end of the sleeve into the cup.

Figure 2:
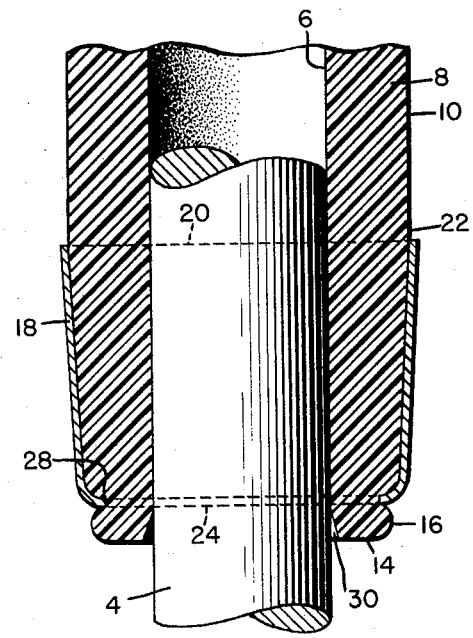
FIG. 2 is a view similar to FIG. 1, showing the elements of the connector pressed together in finally assembled and completed condition.

The method of assembly comprises applying the cup 18 loosely about the tapered lipped end of sleeve 8, then sliding the shaft 4 snugly into the sleeve bore, and finally, applying sufficient force endwise to the cup, or to the sleeve, for driving the end 14 of the sleeve through the cup opening 26 until lip or annulus 16 pops through the opening to the outside of the cup, in accordance with FIG. 2.

Referring to FIG. 1, attention is directed to the provision of a chamfer or undercut 30 inside the bore of the sleeve, and located radially behind the lip or annulus 16, to there reduce the sleeve wall thickness and establish a void between the shaft 4 and the end portion of the sleeve. As will be apparent, forceful projection of the cup over the sleeve results in inward compression of lip 16 to a progressively smaller diameter, this resulting in closing void 30 completely at the instant the lip rides onto the inner edge of cup opening 26 all around the cup.

Further slight advancement of the cup causes lip 16 to pass beyond the inner edge of opening 26 and to spring outwardly according to FIG. 2, thereby effectually embedding the margin of the cup opening in the material of the sleeve where the lip meets the sleeve taper, this being an annular line at 32 defining the width of the lip.

The filleted portion of the cup at ledge 28 shapes and enforces compression of the sleeve material adjacent to lip 16, as shown in FIG. 2, thereby producing a very tight connection with the shaft 4. Also, the full length of the tapered wall of cup 18 contains and tightly compresses the tapered portion of sleeve 8, to reduce the sleeve bore and forcefully embrace the shaft therein. This containment and compression of the sleeve taper is assured and maintained, since it is impossible for the cup to shift in the direction of and over the lip 16, once the lip has been popped through and beyond the cup opening 26.

The drawing, FIG. 2, indicates a slight space at 30 between the shaft and the sleeve, which may occur due to a limited relief of pressure upon lip 16 after the lip has passed the cup opening and assumed its final position beyond the cup bottom. At the cup opening, however, and all along the length of the tapered portion of the sleeve, a powerful compressive force is maintained against shaft 4 precluding movement of the shaft relative to the sleeve.

As was noted herein previously, the sleeve or collar 8 may be of a plastic material or the like having a degree of resiliency and flexibility sufficient to permit flexing of the lip 16 and compression of the material within cup 18, as the cup is pressed or driven to the home position of FIG. 2. Should the connector under certain environments or conditions of use be subjected to heat, expansion thereof within the confines of cup 18 will augment the force of contact between the sleeve and the shaft, thereby enhancing the effectiveness of the connector.

It is to be understood that various modifications and changes may be made in the structural details of the device, within the scope of the appended claims, without departing from the spirit of the invention.

What is claimed is:

1. A connector for application to a substantially cylindrical member of rigid material, comprising an elongate sleeve having a bore lengthwise therethrough for snugly slidably receiving a cylindrical member of an outside diameter substantially the same as the diameter of the bore, the sleeve having an outer periphery and an end with an opening defined by said bore, said sleeve having a relatively long straight conical outer periphery, said sleeve being of elastic material throughout from said end to at least the terminus of the conical taper, said sleeve also including an integral annular lip on the outer periphery thereof and adjacent to said end of the sleeve and projecting radially outwardly therefrom to a diameter greater than the minimal diametral dimension of the taper, the material of the sleeve at the said end thereof being counter-bored at said end, said counter-bore being located radially inwardly of said lip for increasing the diameter of the open end of the bore to facilitate radial compression of the lip annularly toward the bore axis, a rigid substantially cylindrical cup-shaped body having an open end and a substantially straight conical wall tapered from said open end toward the opposite end thereof and corresponding to the taper of said sleeve's outer periphery and having at the bottom of the cup at said opposite end an annular shoulder defining a reduced opening which is smaller than the said diameter of the lip and of the outer periphery of the sleeve just adjacent to the lip but sufficiently large for passage of the lip therethrough when the lip and the portion of the sleeve lying within the circular area defined by the lip are radially compressed to an extent limited by the counter-bore, the said conical wall of the cup having an inside diameter intermediate its length that is smaller than said diameter of the annular lip such that forcible insertion of said end of the sleeve axially into the cup through the first said open end will effect radial compression of the tapered wall portion of the sleeve against a cylindrical member extending through and engaging the bore of the sleeve and effect reduction of the diameter of said counter-bore to an extent to permit the annular lip to pass through said opposite end opening of the cup whereby to assume an operative position beyond the said opposite end of the cup with the cup opening tightly embracing the outer periphery of the sleeve adjacent to the lip.

2. The invention according to claim 1, wherein the said reduced opening defining shoulder in the bottom of the cup at the said opposite end of the cup constitutes an annular ledge or flange extending radially inwardly.

3. The invention according to claim 1 wherein the said reduced opening defining shoulder in the bottom of the cup at the said opposite end of the cup constitutes an annular ledge or flange extending radially inwardly as a curving continuation of the cup wall and forming a rounded inside corner having the function of guiding the lip to the said opening in the bottom of the cup upon the said insertion of said end of the sleeve axially into the cup.

References Cited by the Examiner
UNITED STATES PATENTS

| | | | |
|---|---|---|---|
| 1,648,256 | 11/1927 | Bienenstein | 29—451 |
| 2,281,654 | 5/1942 | Wulle et al. | 339—103 |
| 2,322,491 | 6/1943 | Williams | 339—103 |
| 2,477,818 | 8/1949 | Murdock | 287—119 |
| 2,755,056 | 7/1956 | Hutton | 287—85 |
| 2,793,428 | 5/1957 | Witte | 29—451 |
| 2,916,719 | 12/1959 | Toms | 339—94 |
| 2,937,040 | 5/1960 | Hutton | 287—85 |
| 3,070,392 | 12/1962 | Potter | 287—119 |

CARL W. TOMLIN, *Primary Examiner.*

ROBERT C. RIORDON, *Examiner.*